US008704882B2

(12) United States Patent
 Turner

(10) Patent No.: US 8,704,882 B2
(45) Date of Patent: Apr. 22, 2014

(54) SIMULATED HEAD MOUNTED DISPLAY SYSTEM AND METHOD

(75) Inventor: James A. Turner, Binghamton, NY (US)

(73) Assignee: L-3 Communications Corporation, New York, NY (US)

(*) Notice: Subject to any disclaimer, the term of this patent is extended or adjusted under 35 U.S.C. 154(b) by 377 days.

(21) Appl. No.: 13/300,272

(22) Filed: Nov. 18, 2011

(65) Prior Publication Data

US 2013/0128012 A1   May 23, 2013

(51) Int. Cl.
 *H04N 9/47* (2006.01)
 *G09G 5/00* (2006.01)
 *G09B 19/16* (2006.01)

(52) U.S. Cl.
 USPC ................................ 348/53; 345/8; 434/69

(58) Field of Classification Search
 USPC ................................ 348/53; 345/8; 434/69
 See application file for complete search history.

(56) References Cited

U.S. PATENT DOCUMENTS

| 6,522,474 | B2 | 2/2003 | Cobb et al. |
| 6,552,699 | B2 | 4/2003 | Dugdale |
| 6,612,840 | B1 | 9/2003 | Turner |
| 7,193,585 | B2 | 3/2007 | Takagi |
| 7,719,484 | B2 | 5/2010 | Turner |
| 2004/0004584 | A1 | 1/2004 | Hebert |
| 2005/0140573 | A1 | 6/2005 | Riser et al. |
| 2005/0185150 | A1 | 8/2005 | Turner et al. |
| 2006/0250322 | A1 | 11/2006 | Hall et al. |
| 2009/0066858 | A1 | 3/2009 | Turner et al. |
| 2011/0183301 | A1* | 7/2011 | Turner ............ 434/43 |

OTHER PUBLICATIONS

Livingston, Mark A., et al. "Vertical Vergence Calibration for Augmented Reality Displays". IEEE Virtual Reality, 2006, p. 293-294.
Gossweiler, Rich. "Perception-Based Time Critical Rendering". Jan. 1996.
Wann, John P., et al. "Natural Problems for Stereoscopic Depth Perception in Virtual Environments". Vision Research, vol. 35, No. 19, pp. 2731-2736, 1995.
Browne, Michael P. et al. Improving the Utility of a Binocular HMD in a Faceted Flight Simulator. Interservice/Industry Training, Simulation, and Education Conference (I/ITSEC) 2009, paper 9178, p. 1-11.
Patterson, Robert, et al. "Perceptual Issues in the Use of Head-Mounted Visual Displays". Air Force Research Laboratory Human Effectiveness Directorate War-Fighter Readiness Research Division, AFRL-HE-AZ-TP-2007-03. Feb. 2007.
Abstract for Wetzel et al., "Viewing Distance and the Perceived Size of Simulator Imagery". Journal of the Society for Information Display-Dec. 1996, vol. 4, Issue 4, pp. 247-253.

* cited by examiner

*Primary Examiner* — Dave Czekaj
*Assistant Examiner* — Tsion B Owens
(74) *Attorney, Agent, or Firm* — Tiajoloff and Kelly LLP

(57) ABSTRACT

To overcome problems with vergence, a binocular head mounted display (HMD) is used in a simulator in which an out-the-window scene is displayed in real time on a screen arrangement. Imagery for the left and right eyes of the HMD is derived by generating a starting HMD image for a Cyclops viewpoint between the user's eyes, and then rendering respective views for each eye from the position of the eye in a virtual 3D model of the screen arrangement, wherein the starting HMD image is frustum projected against the screen arrangement of the 3D model.

20 Claims, 8 Drawing Sheets

REAL WORLD HMD

SIMULATOR WITH REAL HMD SYSTEM

LEFT EYE VIEW
(OTW + HMD)

RIGHT EYE VIEW
(OTW + HMD)

SIMULATED HEAD MOUNTED DISPLAY SYSTEM AND METHOD

FIELD OF THE INVENTION

The present invention relates to simulator image display systems, more particularly to simulators in which a head-mounted display is used to display symbology or imagery to the user.

BACKGROUND OF THE INVENTION

Military aircraft and other vehicles are frequently equipped with head-mounted displays (HMDs) through which the operator of the vehicle can see objects in the environment. The HMD displays imagery, especially tactical or other symbology, superimposed over objects in the real world seen from the vehicle to which the information in the imagery relates.

While HMDs are often monocular, the industry is beginning to more frequently employ binocular HMDs. i.e., HMDs with two separate eye displays, usually implemented with a helmet visor that has a semi-reflective mirror over each eye of the operator. Each eye of the operator can see the real world outside the canopy or windshield of the vehicle, and can also see an HMD virtual image reflected in the associated semi-mirror, which is seen as superimposed over the view of the real world.

A diagram of operation of a real-world HMD is seen in FIG. 9. The HMD has two separate eye displays 101, 102 for the left and right eyes L and R. These eye displays 101 and 102 are semi-reflective mirrors, and the user's eyes L and R look through the respective HMD eye displays 101 and 102 and through the vehicle window or canopy 103 at a real object or group of objects that is rarely closer than hundreds of meters, which is, for all intents and purposes, at an infinite distance. Since the eyes are looking at an object at infinity, the lines of sight A and B are therefore parallel to each other, and there is no parallax effect.

FIG. 13 is a schematic diagram of a real HMD system. A head tracker 107 detects the position of the user's head and transmits a signal with data defining the location. From this data and other data of the simulation and the virtual environment, a two-dimensional imagery generator 109 generates a 2-D image, and this image is transmitted and displayed on the left and right eye displays 101 and 102 of the helmet worn by the user. The images displayed on eye displays 101 and 102 are identical to each other, and the images or symbology of the eye displays are in the same location on both of the eye displays. The HMD imagery for both eyes aligns with the distant object or objects to which it relates in the real world, because as shown in FIG. 9 there is no parallax change between the view from one eye relative to the other when the objects to which the imagery relates are at a very great, effectively infinite, distance.

FIG. 10 is a diagram of a simulator with a screen 104 equipped with a real-world binocular HMD with left and right eye displays 101 and 102. These eye displays 101 and 102 are semi-reflective minors as in FIG. 9, and the user can see through them and see the screen 105.

An out-the-window scene, including a virtual object 104 in the virtual simulation environment, is created by a computerized image generator and projected onto a screen 105 that is fairly close, e.g., 40 inches from the operator's eyes. The closeness of the projected images produces some perceptual issues. As is natural and automatic for human binocular vision, the lines of sight C and D triangulate and converge at a convergence angle α when the eyes are looking directly at the object 104 on screen 105, i.e., there is a vergence of the lines of sight C and D. Due to the distance between the eyes and the closeness of the screen 105 to the eyes, there is a parallax effect between the relative eye positions, and each eye sees the object 104 at a slightly displaced and possibly slightly altered perspective. The human brain has no difficulty processing this and sees the object 104 as a single image.

If a real-world HMD display were used with the two eye displays 101 and 102 showing identical HMD images to both eyes, the HMD images will not properly align with the object 104 of the OTW scenery for both eyes. FIGS. 11 and 12 illustrate the problem in somewhat exaggerated form as compared to a real-world HMD display.

In the left-eye view of FIG. 11 and the right-eye view of FIG. 12, the exemplary symbology or imagery 109 of the HMD eye displays 101 and 102 is shown as seen in front of the OTW imagery and the virtual object 104 as rendered on the screen 105, to which the symbology relates. The symbology and the object do not align in the same way in both displays.

The user's eyes will look at the object 104 and see it clearly with the rest of the OTW scene, but the symbology 109 will be seen as in two places relative to the object 104, resulting in a double image. This double-image effect is unrealistic and undesirable in a simulator, and presents a significant problem in training using a binocular HMD in combination with a projected OTW scene. The user may be able to shift back and forth between the OTW and the HMD images, but that creates eye strain or else increased visual cognition time for the user.

Normally, when a viewer simultaneously focuses on two different objects at varying distances, the human visual system is able to merge the two images created by each eve and present a single, merged image to a viewer. As the viewing distance changes, the human eye has the capability to change the optical power to maintain a clear focus by a process called accommodation, wherein the eyes converge or diverge the eyes depending on the distance of the object being viewed, and a viewer is typically unaware that it is happening. When viewing images on a screen at a nominal distance of 40 inches, however, if there is a difference of distance of one half to one inch over the field of view, it will produce a double-image effect in the user's perception, so that the user does not perceive the OTW scenery and the HMD imagery as fused.

To make things even more complicated, the screen may be planar but at a severe angle, depending on the position of the user's head, or the screen may be a spherical dome or a surface that is either curved complexly in three dimensions, or a faceted screen arrangement with planar screens angled relative to each other, as shown in U.S. published application no. 2009/0066858 A1 of James A. Turner published Mar. 12, 2009 and entitled DISPLAY SYSTEM FOR HIGH-DEFINITION PROJECTORS, which is herein incorporated by reference. The relative parallax effect of viewing the screen arrangement from one eye location relative to the other may be quite complicated as a result.

Moreover, the HMD imagery may be more complex than just character-based symbology, and may be a detailed field of view, such as a Forward Looking Infra-Red (FLIR) image. Use of a standard HMD imagery system in such a simulation would make the quality of the virtual training unrealistic and well below the quality of display found in the real vehicle, reducing the value of such training.

Systems have attempted to avoid these vergence problems by employing only a monocular HMD. However, the monocular HMD simulation is not the same experience as the binocular HMD real vehicle operation.

Systems have also provided a binocular HMD in simulation by maintaining the imagery of both eyes statically fixed for looking at displayed objects at a predetermined distance, e.g., the distance to a centerpoint on one of the screens of the screen arrangement. However, when the user starts to look around or move his or her head, the distance and relative angle of the screen varies, and there are variations in the vergence looking at the objects displayed on the screen, with the result that the HMD imagery is not binocularly convergent with the out-the-window imagery.

There are no systems in the prior art that provide for an adequate operation of a binocular HMD in a simulator where out-the-window imagery is displayed on screens or similar display apparatus.

SUMMARY OF THE INVENTION

It is therefore an object of the present invention to provide a head mounted display system for use in a simulator with a display screen that shows out-the-window imagery.

According to an aspect of the invention, this object is accomplished by providing a simulator comprising a display screen arrangement supported so as to be viewed by the user, and a simulation computer system that has computer accessible data storage storing scene data defining a virtual environment of the simulation and virtual objects therein. The simulation computer system generates out-the-window (OTW) scenery video from the scene data, and causes the OTW scenery video to be displayed on the display screen arrangement in real time as OTW scenery visible to the user. A tracking apparatus continually senses a position of the head of the user or a portion thereof in real time and generates from that sensing a tracking signal containing tracking data from which current time-varying locations of the eyes of the user can be determined, and transmits the tracking signal to the simulation computer system. A head-mounted display (HMD) configured to be supported on the head of the user has an eye display over one of the eyes of the user configured to display to that eye of the user HMD imagery video so that the eye of the user sees the OTW scenery video on the screen arrangement therethrough with the HMD imagery video superimposed thereon. The simulation computer system supporting a three-dimensional model of the simulator including data defining a virtual screen arrangement corresponding to the display screen arrangement in the simulator. The simulator computer system generates the HMD imagery video as a sequence of HMD images each corresponding to a respective point in time. This is done by rendering each frame by first generating a starting HMD image corresponding to HMD imagery for a predetermined projection point that is fixed relative to the position of the head of the user based on the data of the tracking signal, and then rendering the HMD image as a view from the location of said eye in the three-dimensional model of the virtual screen arrangement with said starting HMD image projected thereagainst from the projection point.

According to another aspect of the invention, a method for simulating a vehicle for a user comprises providing a simulation station simulating the vehicle and in which the user is accommodated during simulation. The simulation station includes a display screen supported fixedly so as to be viewable to the user in the simulation and an HMD supported on the head of the user and having an eye display over one of the eyes of the user through which the user can view the display screen. The method further comprises displaying on the display screen OTW imagery video in real time, where the OTW imagery video includes rendered images of virtual objects in a virtual environment in which the simulation takes place as defined by scene data stored in a computer accessible memory. Positional information indicative of positions of the eyes of the user is continually detected, and a data signal containing said positional information is transmitted to a computer system. According to the method, HMD imagery video comprising a series of frames that are displayed on the eye display so that the user sees the HMD imagery superimposed over the OTW scenery are generated with the computer system in real time. The generating of each of the frames comprises:

a. deriving a starting HMD image as seen from a predetermined projection point fixedly located relative to the head of the user, and b. deriving a first eye HMD image that corresponds to a rendered view of a computer-supported three-dimensional model of the display screen as viewed from a viewpoint in the model corresponding to the position of the eye associated with the eye display, and where the model is textured with the starting image as projected from the projection point.

Other objects and advantages of the invention will become apparent from the present specification.

DETAILED DESCRIPTION

Figure 1:
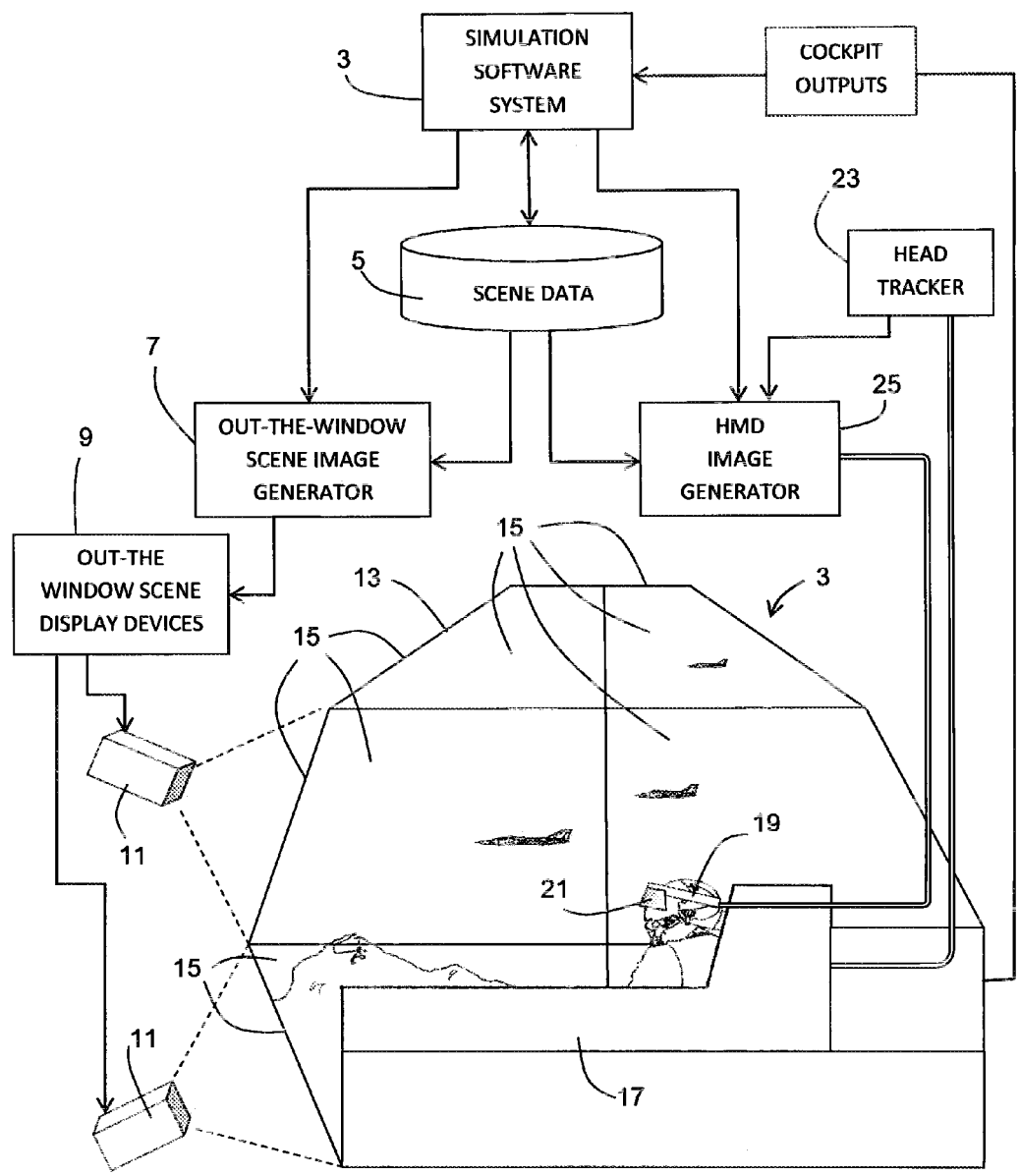
FIG. 1 is a schematic diagram of a simulation system according to the invention.

Referring to FIG. 1, a simulator station 3 is shown. The simulator is a computerized real-time system that interacts with a user, i.e., a trainee pilot when the simulated vehicle is an aircraft.

As is well known in the simulation arts, the simulation software system 3 is a computer system or set of computers connected to operate contemporaneously and administer the simulation by executing stored software, and it administers the entire operation of the simulation, including the operation of the simulated vehicle, all input/output from the simulator, including operator cockpit controls, and also to displays that are shown to the user. The simulator includes a computer system with processor, input/output circuitry, and data storage circuitry and devices supported by a stored operating system and attendant stored software.

The simulation software system 3 includes a computer-accessible data storage device 5 storing scene data that defines the virtual environment in which the simulation operation takes place, e.g., the terrain of the virtual environment, the vehicle being simulated itself, and generally all virtual objects in the virtual environment being defined by specific scene data, as is well known in the art. The scene data is influenced and modified by the simulation software system 3 to conform to the changing locations and content of virtual objects in the virtual environment. The scene data 5 is also accessed and used by an out-the-window (OTW) scene image generator 7 that renders imagery to display to the user that shows the environment outside of the vehicle. The OTW imagery is usually displayed to the user via out-the-window display devices, herein generally identified as 9, which includes preferably a plurality of projectors 11 (not all shown in FIG. 1) that project imagery onto the outer surface of an out-the-window display arrangement 13. For computational speed in real-time image generation, the image generator preferably includes a number of subsidiary image generators connected with the scene data and running in a parallel processing arrangement, with each image generator producing the current frame of a respective one of the projectors.

The out-the-window display arrangement comprises at least one and preferably several screens 15 assembled to form an enclosure. One such design for this type of display arrangement is seen in U.S. published patent application number 2009/0066858 A1 published on Mar. 12, 2009, which shows a plurality of flat screen high definition displays assembled in a nearly spherical arrangement, incorporated by reference in its entirety. Other types of displays may also be used, such as a generally spherical dome such as can be seen in U.S. published patent application number 2005/0185150 A1 of James A. Turner, et al. published on Aug. 25, 2005 and entitled IMAGE DISPLAY SYSTEM AND METHOD FOR HEAD-SUPPORTED VIEWING SYSTEM, which is also herein incorporated in its entirety by reference. Alternatively, the simulation may be a single screen panel of a planar configuration, e.g., an HD LCD monitor.

The screens 15 of the display arrangement 13 are organized around a pilot station 17 in which the user sits. The user is provided with a head mounted display 19, usually with a visor 21 through which the user views the out-the-window displays projected by the out-the-window display devices 9 onto the outer panels 15 of the display screen arrangement 13.

The head mounted display 19 includes a head tracker apparatus by which the position and direction of the head of the user can be detected or the position of the eyes of the user and the direction in which they are looking can be determined. The head tracker includes a component on the head of the user and also additional external communication circuitry 23. Circuitry 23 determines the location of the head, and transmits a signal containing data corresponding to the location and orientation of the head and/or the eyes of the user.

Head mounted displays are frequently provided with such head tracking or eye tracking devices, which are well known in the art. These include magnetic sensors that are able to detect changes in a magnetic field created by movement of the head of the user, sonic sensors that detect the relative locations of ultrasound generators and pick-up microphones in the simulated cockpit, optical sensors, and also mechanical devices that couple the head mount display to the simulation so that the movement of the head of the user can be detected.

The foregoing components of the system are well known in the prior art of simulation.

The head tracker output data is transmitted directly or through the simulation software system 3 to an HMD image generator 25. The HMD image generator 25 generates the head mounted display imagery that is viewed by the pilot on the visor 21 of the head mounted display 19. The HMD imagery itself is two videos each for display to a respective one of the left and right eyes. The video is composed of a series of frames each corresponding to a specific moment in time. Each frame is derived from a specifically generated image based on data from the simulation software system 3, scene data which identifies the location of virtual objects to which symbology or imagery in the HMD image may apply, all as determined for a point of view derived from the signals received from the head tracker 23. The HMD images are each a set of stored data that defines the contents of a frame of HMD imagery video displayed to the user. The stored data may be a raster field, i.e., an array of data defining the pixel color for a two-dimensional field of pixels in a display, as is common in the art. In addition to or instead of the raster data, the stored data may comprise sets of data defining coordinates of endpoints in an output field of view, with the endpoints defining straight-line segments between them that are displayed in the HMD imagery. Written symbology and lines drawn in the HMD images are usually stored in this data format.

As is well known in the art, the output of the out-the-window (OTW) scenery is accomplished by one or more videos each comprising a series of synchronized frames of video that are generated by rendering from the scene data by the OTW scene image generator 7. There are in the preferred embodiment a number of projection screens 15 which are rear projection screens, and each is associated with a respective projector 11 (not all of which are shown in the figures). The OTW scenery video frames are all generated for a given instant in time, and are synchronized so that all of the out-the-window scenes are for the same instant in time repeatedly through the display of the video.

Figure 2:
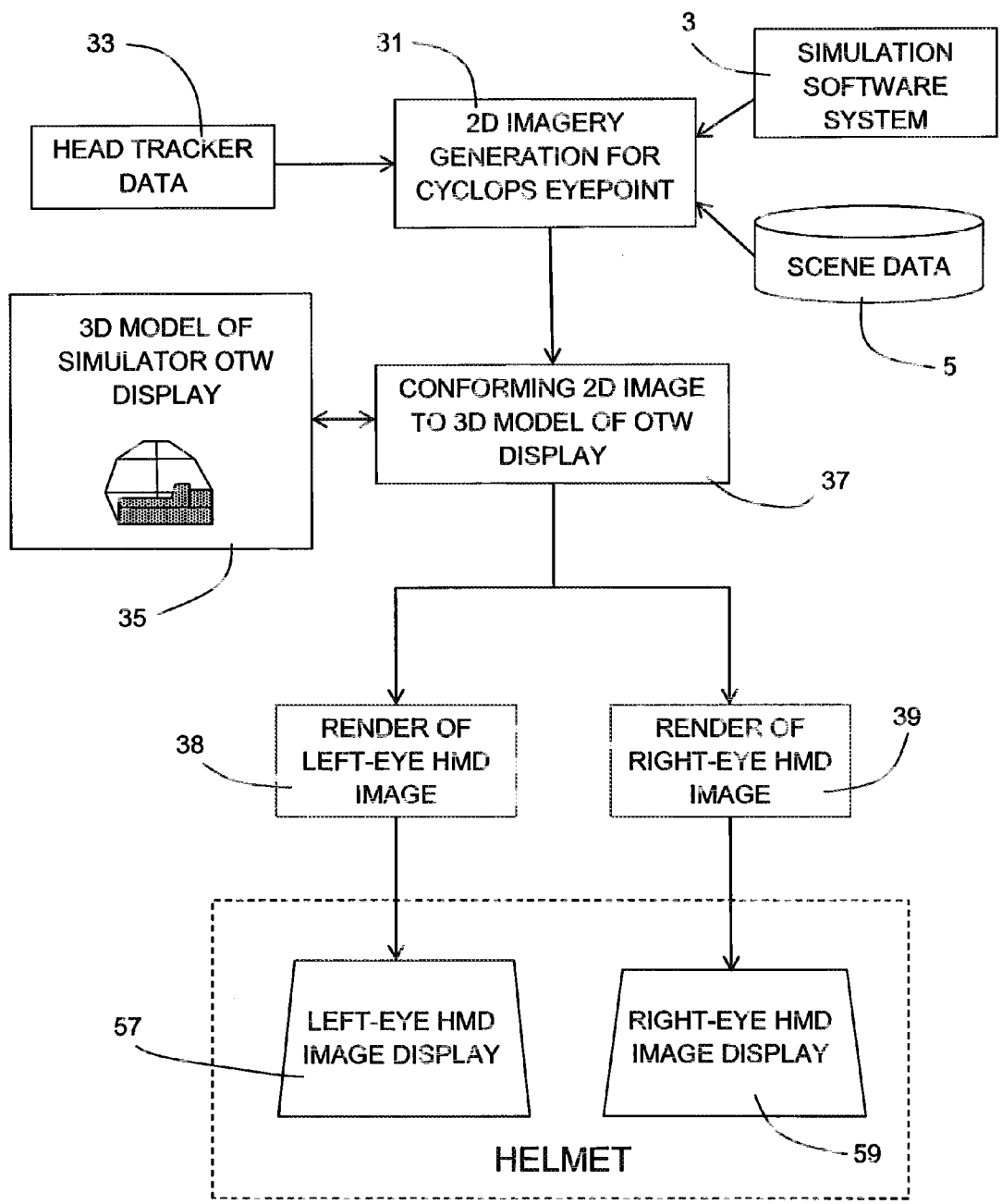
FIG. 2 is a schematic diagram of the internal operation of the HMD in the system of FIG. 1.

Referring to FIG. 2, the HMD image generator is continually directed to produce sequential frames of HMD imagery for display to the left and right eyes of the user through the visor 21. This visor 21 generally is a device worn on the head of the user, such as is shown in U.S. published patent application number 2005/0140573 A1 of Andrew Riser et al. published on Jun. 30, 2005 and entitled IMAGE DISPLAY SYSTEM AND METHOD FOR HEAD-SUPPORTED VIEWING SYSTEM, which is herein incorporated in its entirety by reference. The visor may be two separate visor parts, one over each eye, or a single visor piece covering both eyes. Usually, the visor is of a reflective nature with a mirrored surface through which the user can see the projected out-the-window displays on the screen arrangement 13. The mirrored surface is usually a half mirror, it allows reflection of a video source which is provided for each eye respectively by a separate display. This display may be any of the video display devices known in the art, e.g., an LCD microdisplay, an LED microdisplay, a micromirror device, or any of a variety of microdisplays, preferably that can be supported on the head of a user.

FIG. 2 shows the process steps for the HMD image generation for the left and right eye displays of the binocular HMD. This process is executed by a computer, which may be the same as the computer running the simulation or a separate computer connected with the simulation computer 3. The generation of the HMD video is started periodically by the simulation software system 3, which directs the 2D imagery generation of an HMD video for the frame in a duty cycle of approximately 30 to 60 Hertz. The HMD video is generated in real time so that there is no perceptible jerking in the nature of the display, and it is synchronized with the out-the-window video frames, so that the HMD display at any given moment in time is for the same instant in time as the frames of OTW video that are being displayed at that moment.

First, 2D image generator 31 accesses the scene data 5 for the overall system for locations of virtual objects in a virtual environment the scene data defines, and also receives the head tracker data 33 indicating the position of the head of the user, and/or the user's eyes as is known in the prior art. Based on this data and on other data relating to the HMD such as operational parameters of the real-world HMD device being simulated, its settings in the simulation, and data defining symbology or imagery to be displayed, the image generator 31 generates in real time a starting image of the HMD imagery. This image is essentially a monocular HMD display image for a single projection point fixedly located relative to the head of the user, i.e. that moves with the head of the user and always remains in the same position relative to the eyes of the user, and looking in the direction of the line of sight of the user in the simulator, as derived from the orientation and location data of the head tracker signal. This projection point is preferably the theoretical Cyclops' point, i.e., the midpoint in the line between the two eyes of the user.

The preparation of this starting 2D image is by any of the monocular HMD image generation processes known in the prior art of generating imagery or symbology that is to overlie the OTW scenery for a field of view from this theoretical Cyclops' point. The image formulated comprises stored data defining the HMD imagery to be displayed.

Generally, the 2D image generated for the Cyclops' point is of one of two types or a combination thereof.

For one, the image may be a raster field in the form of a two-dimensional array of pixel color values defining a raster display of a predetermined, generally-rectangular shape. In the raster format, the imagery may be direct video type imagery such as one would derive from a FLIR display. The resolution of this raster is preferably somewhat higher than that of the actual displays of the head mounted display microdisplays or LEDs or whatever system is employed, because the rendering process will involve a reduction in some resolution depending on the nature of the angles involved.

Figure 6:
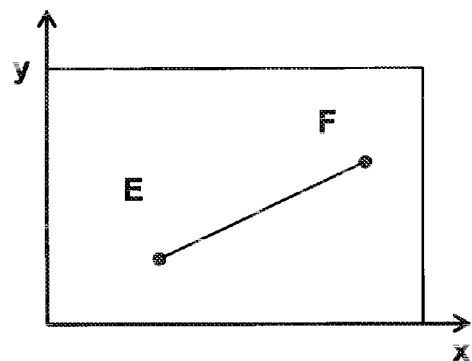
FIG. 6 is a diagram showing the field of the generated HMD image with a defined segment thereon.

Alternatively, or in combination with a raster array, the image may comprise a list of pairs of endpoints defined by a Cartesian coordinate system of the display screen, as seen in FIG. 6, or a combination thereof The endpoint pairs define straight line segments therebetween in the Cartesian field corresponding to the HMD view. This type of segment-based HMD imagery is preferable when there is written symbology and even arcs and curved lines are drawn as a series of very short segments. Where the symbology of this type is combined with a raster image, the end result is data comprising a raster field array and a collection of pairs endpoints for segments that are to be drawn on top of the raster image.

Once this 2D image has been created by the HMD image generator 31, the HMD image generator system, which again may be implemented as a single or multi-processor computer system processing the image data, conforms the 2D image to a 3D model of the simulator out-the-window display 35 in a further mapping process step or module 37.

The 3D model of the simulator is prepared according to well-known modeling procedures. The model generally comprises stored computer-accessible data that defines one or more virtual surfaces, which correspond to the surfaces of the displays on which the OTW imagery is displayed. The surfaces are all in a virtual 3D environment with a three-dimensional coordinate system that defines their relative positions. In addition, the eye positions of the user are defined in this model coordinate system based on the head tracking data.

Figure 3:
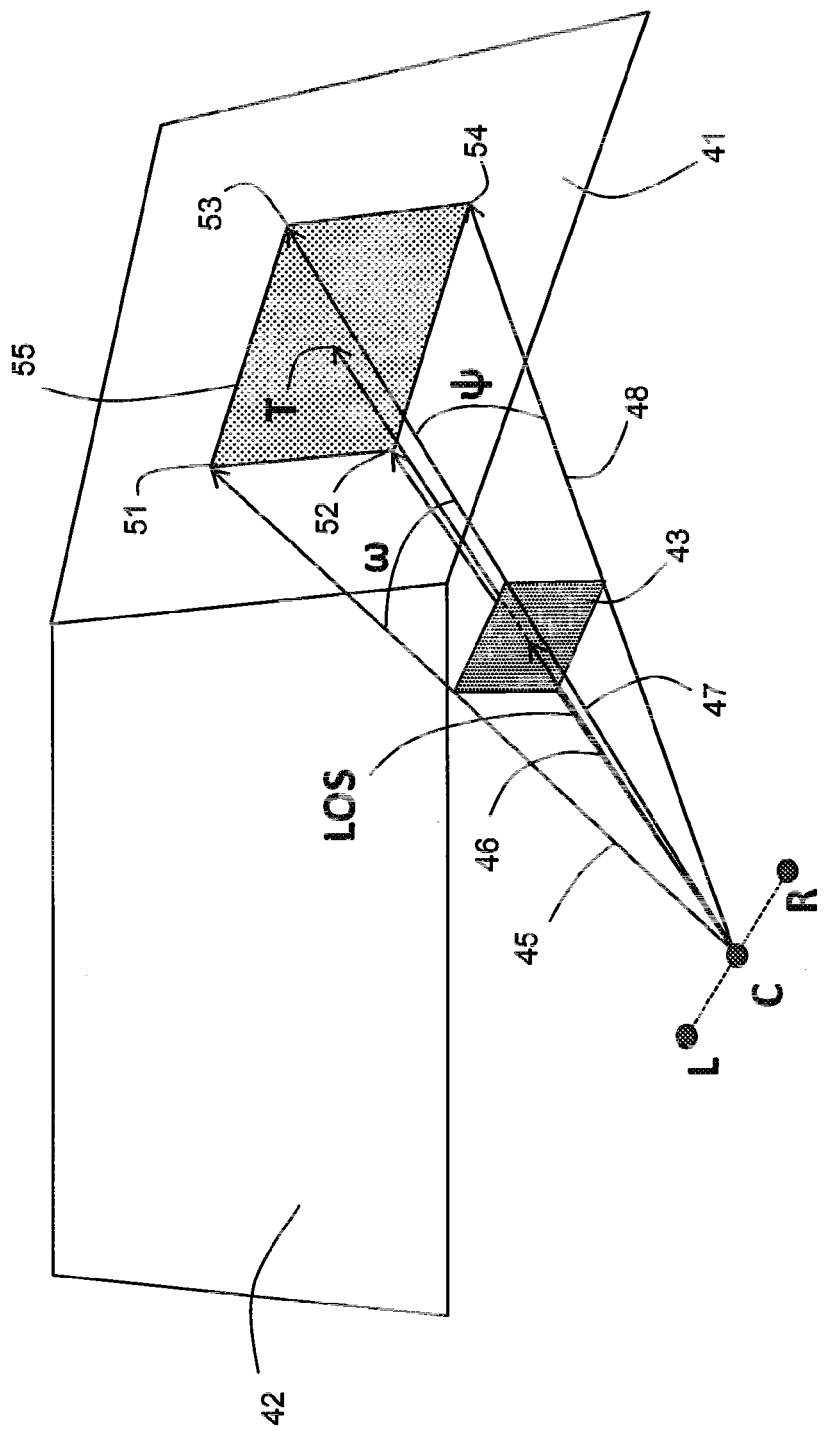
FIG. 3 is a diagram illustrating the projection of a generated HMD image from a projection eye point onto the virtual screens of the model of the simulator display.

The process performed by module 37 for a raster type image is shown in FIG. 3. In this illustration, the model 35 supports a data storage that defines the screens of the display arrangement, e.g. planar screens 41 and 42. The 2D image 43 is projected in a frustum based on a pyramid with an apex at the Cyclops' eye point C as defined inside that 3 dimensional space point C and a frustum top plane 43. The frustum is between four lines from the projection point C to the four corners of this raster image 43, i.e. rays 45, 46, 47 and 48, which extend up to respective points 51, 52, 53 and 54 located on the screen 41 as defined in the 3D model 35. For purposes of this illustration, all these points 51, 52, 53 and 54 lie on a single screen 41 in the model. The points, however, could be on several surfaces in the model, depending on the location and the orientation of the line of sight.

The projection frustum extends from the projection point C with a lateral angle ω between the left and right sides of the frustum, and a vertical angle ψ between the top and bottom sides. These angles accommodate the raster or monocular 2D starting HMD image field 43 at a distance from point C such that the symbology or imagery thereof aligns properly with the OTW imagery. The centerline axis LOS of the frustum is the line of sight as determined by the head tracker. The frustum may be rotationally displaced around this line LOS based on the orientation of the user's head, and the position of the bottom edge of the 2D image 43 is parallel to the line between the user's eyes L-R. The point of intersection T between the line of sight LOS and the surfaces of the model 35 is also determined.

Once the points C and T are determined, the 2D starting image 43 is applied, as is well-known in the art, to the surface or surfaces 41, 42 as a texture a field It will be understood that the terms used herein for the model are in some sense figurative, since there is no actual surface nor texture applied to it, but that there is a mapping of data that corresponds analytically to a texturing. A ray trace for each pixel of the raster image 43 is extended until it strikes a surface of the 3D model, and the area that is struck is mapped to correspond to that pixel color. The mapped texture when all the pixels of the image 43 are so extended defines the appearance of an area 55 on the surfaces of the model. The rest of the surfaces of the model are blank, and have no color or appearance.

Referring again to FIG. 2, once the conformed 2D image is mapped onto the 3D model 35, the model 35 is provided to a further image generation process wherein the left and right eye HMD images are generated for viewpoints within the 3D model corresponding to the locations of the respective right and left eyes of the user as determined by the head tracker. This rendering is performed by image generators 38 and 39, each of which produces a respective HMD image. The image generators may be parallel processors, or may be a single processor performing the renderings sequentially if the host computer system has adequate processing speed to do so within the duty cycle.

Figure 4:
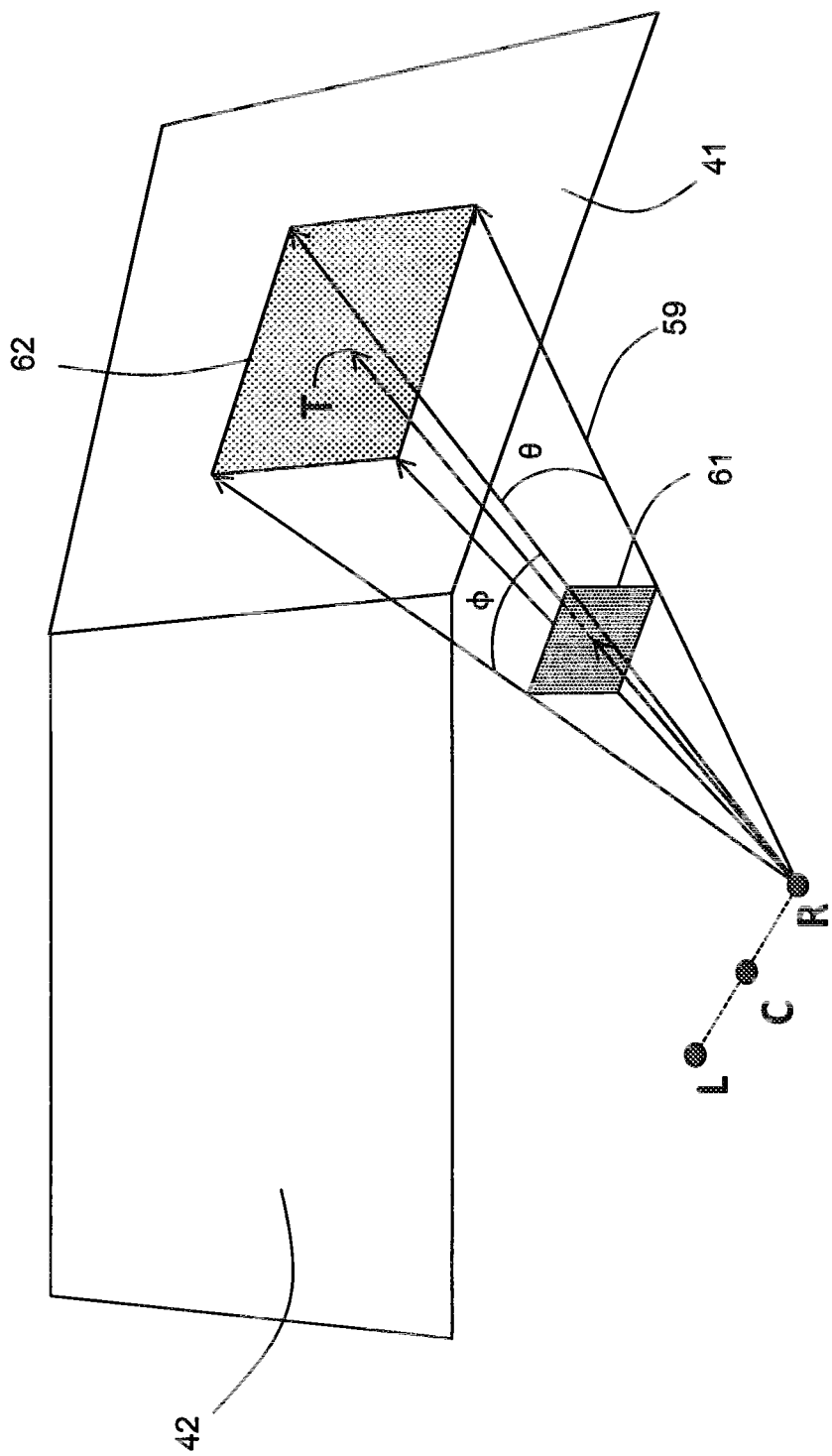
FIG. 4 is a diagram illustrating the rendering of the right-eye HMD imagery.

The rendering of the right eye's HMD image is shown in FIG. 4. The positions in the 3D model of the left and right eyes L and R are established by the data from the head tracking device. The rendering is by any rendering process, preferably by a standard ray tracing process in a viewing frustum.

The view that is derived is an image which is normally rectangular and corresponds to a rectangular cross section 61 of frustum 59 with its pyramidal apex at R, the right eye of the user. The viewing frustum 59 is oriented with a centerline axis along the line of sight between the right eye R and the determined projection intersection point T. It is rotated about this axis such that the horizontal orientation of the rendered image 61 is parallel to the line L-R between the user's eyes. The frustum 59 has vertical and horizontal angles θ and φ such that the image of frustum top 61 is scaled appropriately for display on the HMD device employed in the simulator.

The rendering proceeds by sequentially identifying the color of the view of the textured model for each pixel of the pixel array of the top 61 of the viewing frustum 59 by standard rendering, e.g., detection of the location seen from eyepoint R through the pixel by a ray trace, and the determination of its color and intensity. The area viewed in the model in the rendering is the base of the frustum 59, seen in FIG. 4 as quadrilateral 62, and it at least partially overlies the area 55 (see FIG. 3) on which the 2D image is mapped as texture. It will be understood that the area 62 might extend over two or more different surfaces of the 3D model. Also, due to the slightly different angle of view, the two areas 55 and 62 may not be exactly coextensive.

Figure 5:
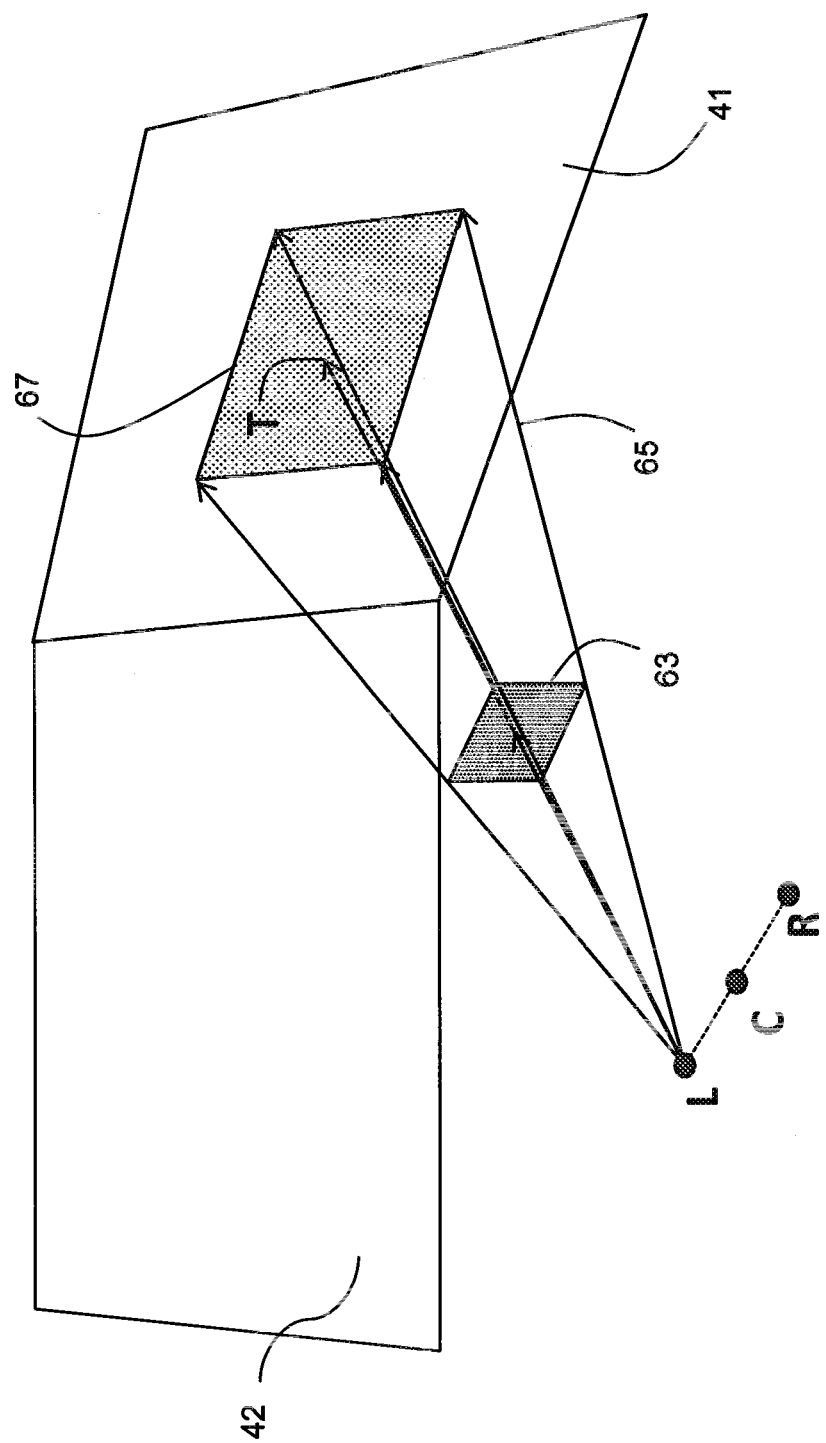
FIG. 5 is a diagram as in FIG. 4, showing the rendering of the left eye HMD imagery.

Referring to FIG. 5, a similar rendering process is applied for rendering the view of the textured 3D model from the location of the left eye as determined by the head tracking apparatus within the model 35 of the screen arrangement. A frustum 65 is created with a pyramidal apex at the left point L, and a centerline axis on the line L-T. The top of the frustum 65 is a rendered pixel field 61, rotated so that the horizontal direction of the pixel field 63 is parallel to line L-R. The color of each pixel is determined as for the right-eye image discussed above, i.e., by ray tracing from the L viewpoint across the field of pixels and identifying for each pixel the appropriate color to be assigned to it.

Once the left and right HMD images are rendered as fields of pixels, pixels are prepared for the HMD display, they are output to the respective left or right eye displays on the visor 21. The output may be immediate, or there may be additional processing to massage the pixel image into a format which is more readily viewed due to other considerations of the head mounted apparatus, such as e.g. distortion in the projection optics used for the microdisplay to get the image to reflect off the visor 21 and to be seen by the user.

The treatment of HMD imagery that is not in pure raster form, but in defined segments between pairs of points is similar to that described above, relying on a mapping process where the 2D segments are applied to the 3D model analogously to how the raster field is mapped.

Figure 7:
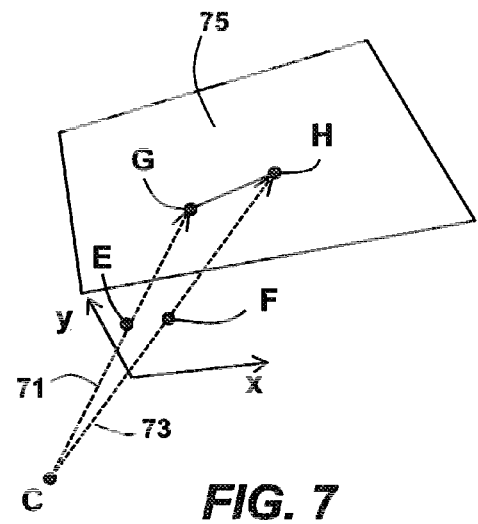
FIG. 7 is a diagram illustrating the projection of the segment of the image of FIG. 6 onto a screen of the 3D simulator model.
Figure 8:
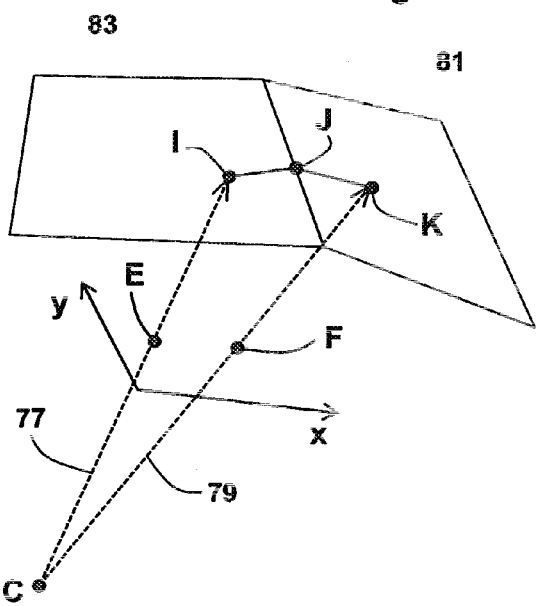
FIG. 8 is a diagram illustrating the projection of a single segment onto two screens of the of the 3D simulator model.
Figure 9:
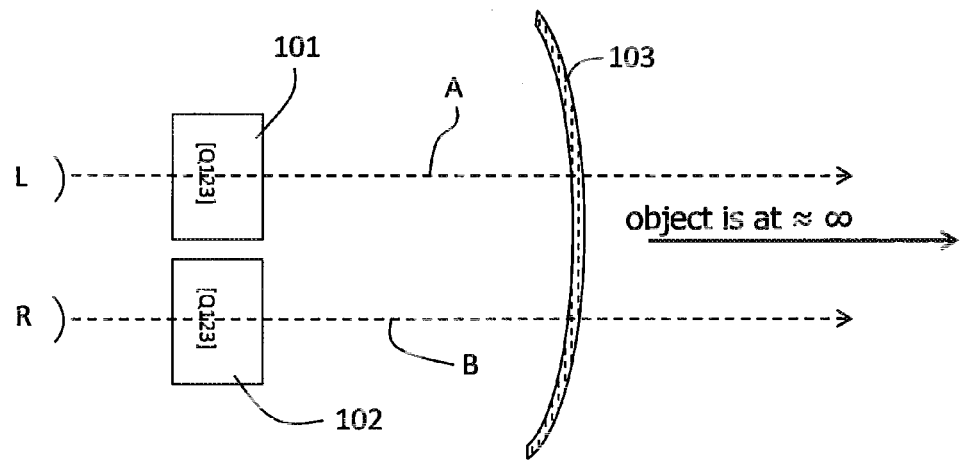
FIG. 9 is a diagram of a real vehicle equipped with a binocular HMD system in an actual aircraft cockpit.
Figure 10:
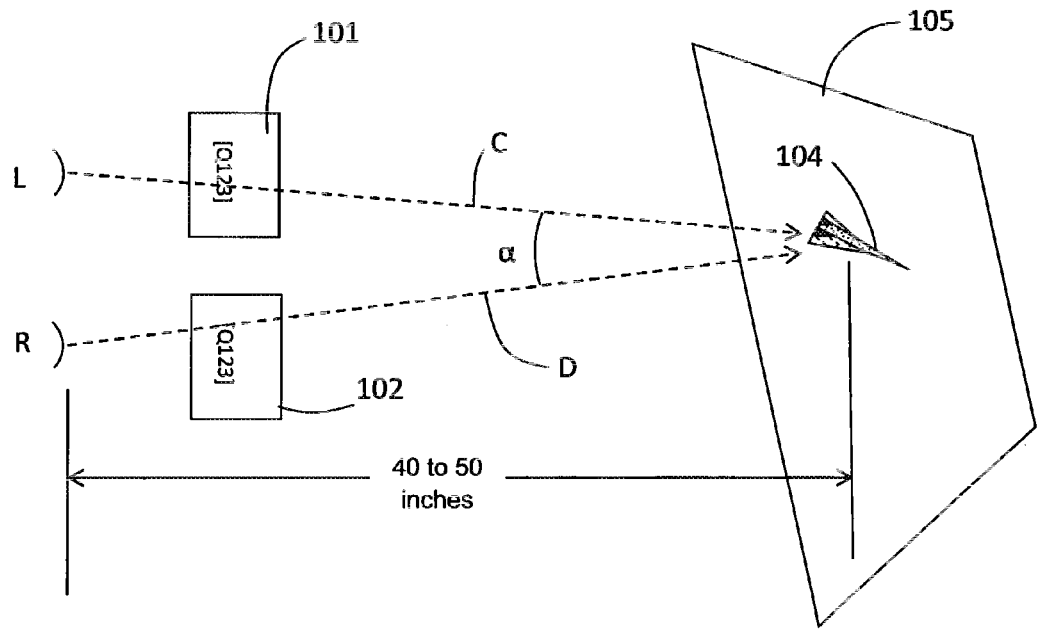
FIG. 10 is a diagram of a simulator equipped with a real binocular HMD with identical imagery for both eyes.
Figure 11:
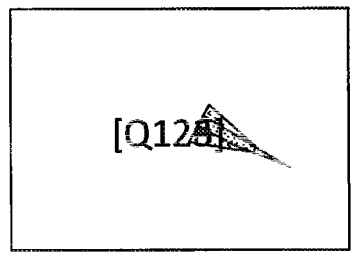
FIGS. 11 and 12 are diagrams of the view seen by the user's eyes in the simulator of FIG. 10.
Figure 12:
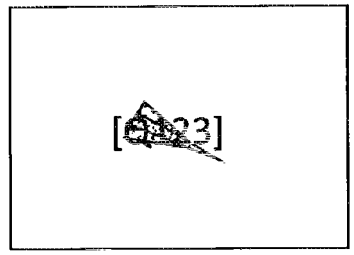
Figure 13:
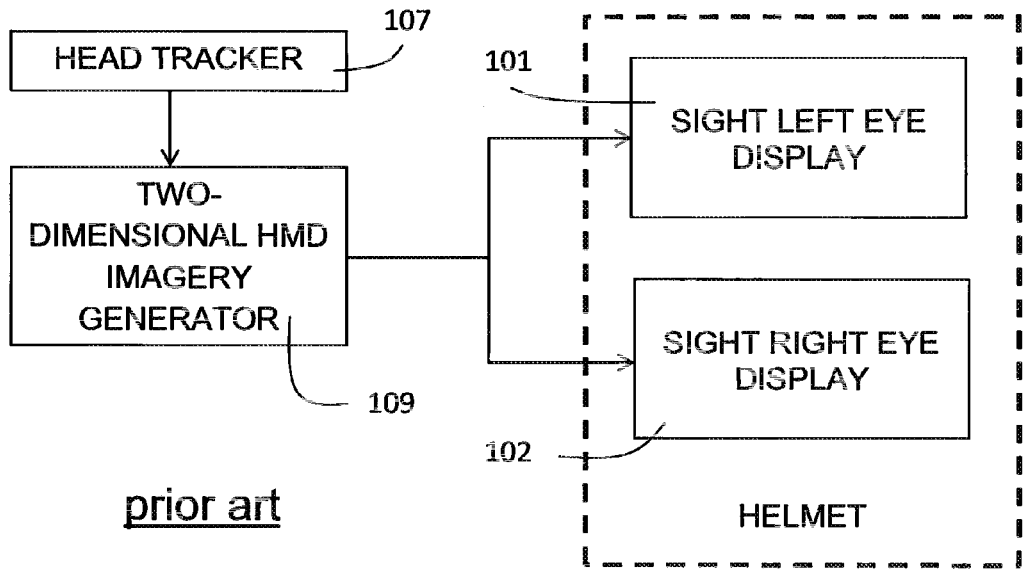
FIG. 13 is a schematic diagram of a real-vehicle binocular HMD system of the prior art, in which both eyes are shown the same image.

Referring to FIG. 6, an exemplary simple HMD image of this type is illustrated as a segment between two points E and F located at positions defined in an x-y coordinate system in which the coordinates correspond to positions in the field of view of the HMD imagery from the Cyclops' eye point. The range of values of the coordinates may be from 0 to 1, or from −1 to 1, or to ranges defined by larger numbers, so long as the dimensions of the field are appropriate to the monocular field of view In conforming HMD imagery of this type to the model, a method is employed as is shown in FIG. 7. The Cyclops or projection eye point C is used as the starting point for vectors that are extended through the two endpoints E and F as defined in the x-y coordinate plane, and then the points of intersection of these lines of sight 71 and 73 with a virtual screen 75 in the 3D model are drawn. These points of intersection G and H are considered the endpoints of the line, and the model is updated to include a straight line running along surface 75 between points G and H on screen 75.

A slightly different approach is applied where the points E and F of a segment are on different screen surfaces in the model 35. To ensure the alignment of the segment on the surface so that there is no distortion in the HMD image, the segment is projected with lines of sight 77 and 79 through the x-y coordinates scaled to conform to the monocular field of view of an HMD visor viewed from the Cyclops' eye. The intersection points of these rays with the different virtual screens 81 and 83 of the 3D model are determined. A plane is then extended through the 3 points C, I and J. The point K where this plane intersects the border between the two panels 81 and 83 is identified, and then the segment is written onto the 3D model as a combination of two sub-segments, these being (i) the segment from I to K lying in the plane of screen 83 and (ii) the segment of K to J lying in the plane of screen 81.

The segment data in the actual simulation is of course not just one line as shown in this example, but may be many, many segments, such as where a curved line is drawn using hundreds of tiny segments, or where a written message appears in the HMD and each letter is formed of several segments and other visual vectors or lines, all of which segments are treated as described here.

The screens shown in the example are planar. In a different screen arrangement, such as where there is a curved surface screen in the 3D model, any segment that does not lie on or very close to its surface may be subdivided into smaller sub-segments that do.

Once the model is prepared with the segment data, the rendering process for the left and right eyes viewing the intersection T of the center point of the field of view with the screen model is as shown thereafter in FIGS. 4 and 5 for generation of the ultimate HMD display for each eye.

The terms used herein should be seen to be terms of description rather than terms of limitation as those are the distortions before them will be able to make modifications and changes thereto without departing from the spirit of the invention.

What is claimed is:

1. A simulator for training in simulation to a user, said simulator comprising: a display screen arrangement supported so as to be viewed by the user; a simulation computer system having computer accessible data storage storing scene data defining a virtual environment of the simulation and virtual objects therein, said simulation computer system generating out-the-window (OTW) scenery video from the scene data, and causing the OTW scenery video to be displayed on the display screen arrangement in real time as OTW scenery visible to the user; a tracking apparatus continually sensing a position of the head of the user or a portion thereof in real time and generating from said sensing a tracking signal containing tracking data from which current time-varying locations of the eyes of the user can be determined, and transmitting said tracking signal to the simulation computer system; a head-mounted display (HMD) configured to be supported on the head of the user, said HMD having an eye display over one of the eyes of the user configured to display to said eye of the user HMD imagery video so that an eye of the user sees the OTW scenery video on the screen arrangement there through with the HMD imagery video superimposed thereon; said simulation computer system supporting a three-dimensional model of the simulator including data defining a virtual screen arrangement corresponding to the display screen arrangement in the simulator; the simulator computer system generating said HMD imagery video as a sequence of HMD images each corresponding to a respective point in time by rendering each frame by first generating a starting HMD image corresponding to HMD imagery for a predetermined projection point that is fixed relative to the position of the head of the user based on the data of the tracking signal, and then rendering the HMD image as a view from the location of said eye in the three-dimensional model of the virtual screen arrangement with said starting HMD image projected there against from the projection point.

2. The simulator of claim 1, wherein the HMD has a second eye display over the other of the eyes of the user configured to display to said other eye of the user second HMD imagery video so that the other eye of the user sees the OTW scenery video on the screen arrangement therethrough with the second HMD imagery video superimposed thereon;
the simulator computer system generating said second HMD imagery video as a second sequence of HMD images each corresponding to a respective point in time by rendering each frame by rendering the HMD image as a view from the location of said other eye in the three-dimensional model of the virtual screen arrangement with said starting HMD image projected thereagainst from the projection point.

3. The simulator of claim 2, wherein the eye displays of the HMD are part of a visor supported on a helmet configured to be worn by a user, said eye displays each including
a respective mirror member supported in front of the associated eye of the user and through which the user can see the display screen arrangement, and
a respective image display device that is reflected in said mirror member so as to be seen by the associated eye of the user, each of said image display devices comprising an LCD or LED producing a visible image in real time that is seen reflected in the associated mirror member in focus with and superimposed over the out-the-window scene.

4. The simulator of claim 1, wherein the display screen arrangement comprises a rear-projection screen.

5. The simulator of claim 1, wherein the starting HMD images are defined by data that include a plurality of straight segments in the starting HMD image that are each defined by a respective pair of endpoints in a two-dimensional reference frame of the starting HMD image, said rendering including projecting said endpoints onto the virtual display screens in the model and then drawing a straight line therebetween.

6. The simulator of claim 5, wherein the display screen arrangement comprises a plurality of substantially planar display screens supported contiguous to and angulated with respect to one another, and the three-dimensional model of the simulator includes data defining the virtual screen arrangement corresponding to positions of said screens, and
said rendering includes identifying one of the straight segments that has endpoints on different display screens, and projecting said straight segment onto the virtual screen arrangement by dividing the segment into a segment portion on each of the display screens involved defined by two endpoints both of which are on the same display screen in the model.

7. The simulator of claim 1, wherein the starting HMD images are rasterized images that are projected as texture onto the virtual display screen arrangement of the model as a frustum projection with an apex at the predetermined projection point.

8. The simulator of claim 7, wherein the starting HMD images further include data defining straight-line symbology segments by data values defining endpoints thereof in the rasterized images.

9. The simulator of claim 7, wherein the HMD video imagery includes simulated FLIR imagery.

10. The simulator of claim 1, wherein the display screen arrangement has a non-planar three-dimensional shape and the three-dimensional model of the simulator includes data defining the virtual screen arrangement as a virtual surface corresponding to the non-planar three-dimensional shape.

11. The simulator of claim 1, wherein the tracking apparatus includes an apparatus supported on the head of a user detecting the position of the head of the user and comprising magnetic sensors, sonic sensors, or optical sensors operatively associated therewith, or a mechanical coupling with the apparatus on the head of the user.

12. The simulator of claim 1, wherein the tracking apparatus generates a signal containing data including a position of the head of the user and an angular orientation thereof.

13. The simulator of claim 1, wherein the predetermined projection point is a Cyclops point midway between the locations of the eyes of the user as determined from the tracking signal.

14. A method for simulating a vehicle for a user, said method comprising:
providing a simulation station simulating the vehicle and in which the user is accommodated during simulation, said simulation station including a display screen supported fixedly so as to be viewable to the user in the simulation and an HMD supported on the head of the user and having left and right eye displays through which the user can view the display screen over the left and right eyes of the user;
displaying OTW imagery video in real time on the display screen, said OTW imagery video including rendered images of virtual objects in a virtual environment in which the simulation takes place as defined by scene data stored in a computer accessible memory and managed by a computer system administering the simulation;
continually detecting positional information indicative of positions of the eyes of the user and transmitting a data signal containing said positional information to the computer system;
generating in real time with said computer system left- and right-eye HMD imagery video comprising a series of left- and right-eye frames that are displayed on respective eye displays so that the user sees the HMD imagery superimposed over the OTW scenery;
said generating of each of said frames comprising
deriving a starting HMD image as seen from a predetermined projection point fixedly located relative to the head of the user, and
deriving left- and right-eye HMD images that corresponds to a rendered view of a computer-supported three-dimensional model of the display screen as viewed from a viewpoint in the model corresponding to a current determined position of the left or the right eye respectively, wherein the starting image is projected onto the model; and
displaying the left- and right-eye HMD imagery video on the left and right eye displays respectively.

15. The method of claim 14, wherein a head tracker transmits information for the user's right and left eye positions to a computer system.

16. The method of claim 15, wherein the predetermined projection point is located midway between the right and left eyes of the user.

17. The method of claim 14, wherein said computer system calculates multiple frames per second so that a user viewing images in the vehicle simulator does not experience any hesitation or visual distortions while viewing the images.

18. The method of claim 14, wherein the starting HMD image comprises computer-stored data corresponding to a raster image field.

19. The method of claim 14, wherein the starting HMD image comprises one or more data sets each defining a respective pair of endpoints of a segment of the starting HMD image, and wherein the deriving of the left and right eye HMD images includes locating the endpoints on the model of the display screen and rendering the left and right eye HMD images with a line therebetween.

20. The method of claim 14, wherein the display screen comprises at least two screen facets supported angled with respect to each other,
- wherein the starting HMD image comprises one or more data sets each defining a respective pair of endpoints of a segment of the starting HMD image, and
- wherein the deriving of the left and right eye HMD images includes locating the endpoints on respective screen facets of the model of the display screen,
- determining a midpoint where the screen facets meet that is coplanar with the endpoints and the left or right eyepoint, and
- rendering the left and right eye HMD images with a line segment between one of the endpoints and the midpoint and a line segment between the midpoint and the other of the endpoints.

* * * * *